J. A. CRANDALL.
Velocipede.

No. 199,518.        Patented Jan. 22, 1878.

UNITED STATES PATENT OFFICE.

JESSE A. CRANDALL, OF BROOKLYN, NEW YORK.

IMPROVEMENT IN VELOCIPEDES.

Specification forming part of Letters Patent No. 199,518, dated January 22, 1878; application filed November 2, 1877.

*To all whom it may concern:*

Be it known that I, JESSE A. CRANDALL, of the city of Brooklyn and State of New York, have invented a new and useful Improvement in Velocipedes, which invention is fully set forth in the following specification, reference being had to the accompanying drawing, in which—

Figure 1:
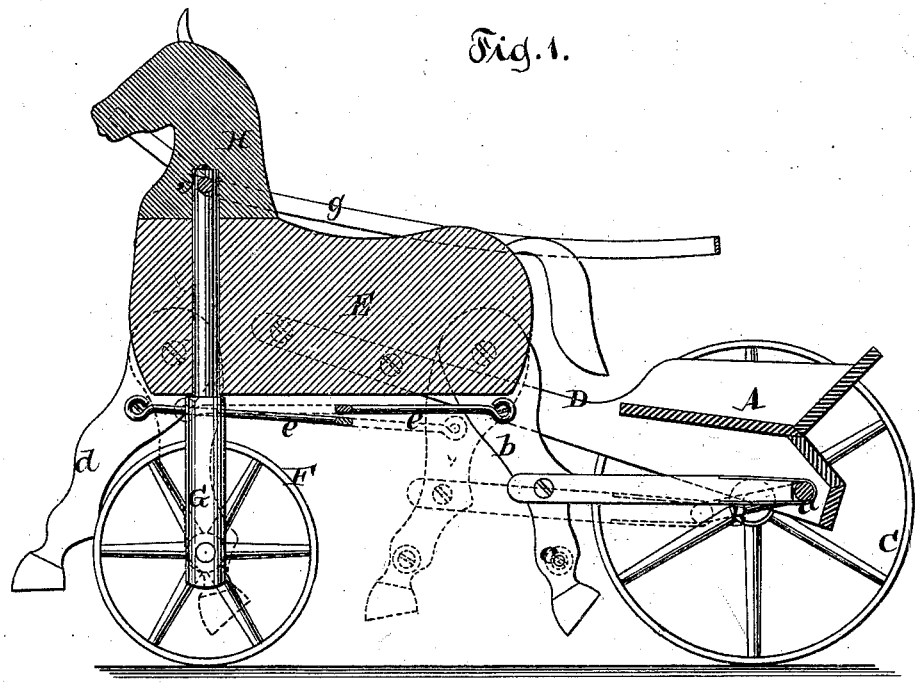
Figure 2:
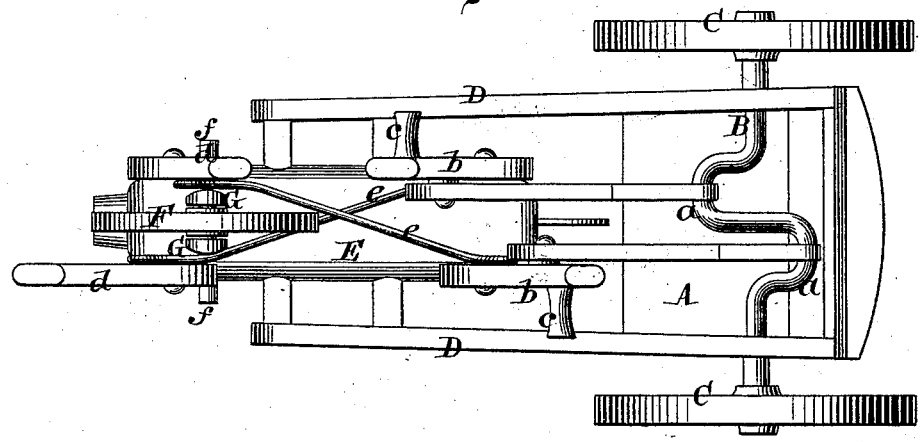

Figure 1 represents a sectional side view. Fig. 2 is an inverted plan.

Similar letters indicate corresponding parts.

This invention consists in the combination, with a three-wheel velocipede, of the body of an imitation horse, which is supported by the front or steering wheel, and by the thills extending from the seat, a double-crank shaft, on which are mounted the hind wheels, and the cranks of which connect with the hinged hind legs of the horse, pedals attached to the hind legs, and cross-rods extending from the hinged hind legs to the hinged front legs, so that by applying power to the pedals the velocipede is propelled, and at the same time a trotting motion is imparted to the horse. From the steering-wheel extends a standard through the body of the horse into its head, and from the side of the head extend rigid arms, to which is secured a bridle or rein, so that by pulling this rein the head of the horse and the steering-wheel are turned simultaneously in the direction in which the velocipede is to move.

In the drawing, the letter A designates the seat of my velocipede, which is supported by the axle B of the hind wheels C. From said seat extend the thills D, between which is secured the figure E of a horse, the front part of which rests upon the front or steering wheel F.

The axle B is provided with two cranks, $a\ a$, which are set in opposite directions, and each of which connects with one of the hind legs $b$ of the horse. These hind legs swing on pivots secured in the body of the horse, and they are provided with pedals $c$ in a convenient position to be operated by the person occupying the seat A. The front legs $d$ of the horse are also made to swing on pivots, and they connect with the hind legs by cross-rods $e$—that is to say, the left front leg is connected to the right hind leg, and the right front leg to the left hind leg. When the velocipede is set in motion, the horse E assumes a trotting motion.

The steering-wheel F is mounted in a forked standard, G, which extends up through the body of the horse, and is firmly secured in the head H, said head being made detached from the body, so that it can turn in either direction with the standard. From each side of the head extends an arm, $f$, and to these arms is connected the rein $g$. By pulling the rein the head H and steering-wheel F are turned, and thereby the direction in which the velocipede is to move is controlled. In order to facilitate the operation of steering, one of the hind wheels is mounted loosely on its axle, while the other is firmly secured thereon.

What I claim as new, and desire to secure by Letters Patent, is—

1. In a velocipede, the combination of the vibrating legs of an imitation horse, the crank-shaft of the driving wheel or wheels, and suitable connecting-rods, substantially as described.

2. The double-crank shaft B of the driving-wheels, vibrating hind legs $b\ b$, fore legs $d\ d$, and connecting-rods, substantially as described.

3. The combination of the vibrating hind legs and vibrating fore legs of the imitation horse, connecting cross-rods $e\ e$, and suitable connections with the driving-wheels, substantially as and for the purpose set forth.

In testimony that I claim the foregoing I have hereunto set my hand and seal this 25th day of October, 1877.

JESSE A. CRANDALL. [L. S.]

Witnesses:
W. HAUFF,
E. F. KASTENHUBER.